(12) United States Patent
Kim et al.

(10) Patent No.: US 10,564,603 B2
(45) Date of Patent: Feb. 18, 2020

(54) DIGITAL HOLOGRAPHIC RECONSTRUCTION DEVICE AND METHOD USING SINGLE GENERATION PHASE SHIFTING METHOD

(71) Applicant: NAEILHAE, CO. LTD., Seongnam-si, Gyeonggi-do (KR)

(72) Inventors: Byung Mok Kim, Seoul (KR); Mal Eum Sung, Seoul (KR); Seong Jin Park, Seoul (KR); Sang Jin Lee, Seoul (KR)

(73) Assignee: NAEILHAE, CO. LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/173,073

(22) Filed: Oct. 29, 2018

(65) Prior Publication Data

US 2019/0121292 A1 Apr. 25, 2019

Related U.S. Application Data

(63) Continuation of application No. PCT/KR2017/013238, filed on Nov. 21, 2017.

(30) Foreign Application Priority Data

Nov. 22, 2016 (KR) .................. 10-2016-0155752

(51) Int. Cl.
*G03H 1/08* (2006.01)
*G03H 1/04* (2006.01)
(Continued)

(52) U.S. Cl.
CPC ....... *G03H 1/0866* (2013.01); *G02B 27/2292* (2013.01); *G02B 27/28* (2013.01);
(Continued)

(58) Field of Classification Search
CPC .............. G03H 1/0443; G03H 1/0866; G03H 2001/005; G02B 27/2292; G02B 27/28; G03B 35/24
See application file for complete search history.

(56) References Cited

U.S. PATENT DOCUMENTS

2007/0216906 A1* 9/2007 Javidi .................... G01B 9/021
356/457
2010/0110260 A1 5/2010 Shin et al.
(Continued)

FOREIGN PATENT DOCUMENTS

JP 2003149080 A 5/2003
KR 100838586 B1 6/2008
(Continued)

OTHER PUBLICATIONS

International Search Report (PCT/ISA/210) dated Feb. 5, 2018, by the Korean Patent Office as the International Searching Authority for International Application No. PCT/KR2017/013238.
(Continued)

*Primary Examiner* — Obafemi O Sosanya
(74) *Attorney, Agent, or Firm* — Buchanan Ingersoll & Rooney PC

(57) ABSTRACT

A time delay error occurring in the case of acquiring two holograms (object hologram and reference hologram) necessary for reconstruction in the related art or in the case of acquiring four physical holograms having different phase shift degrees may be removed. DC noise (including background noise) may be completely removed by using a software-implemented phase shifting method.

19 Claims, 7 Drawing Sheets

(51) Int. Cl.
*G02B 27/28* (2006.01)
*G03B 35/24* (2006.01)
*G02B 27/22* (2018.01)
*G03H 1/00* (2006.01)

(52) U.S. Cl.
CPC ........... *G03B 35/24* (2013.01); *G03H 1/0443* (2013.01); *G03H 2001/005* (2013.01)

(56) References Cited

U.S. PATENT DOCUMENTS

2012/0116703 A1  5/2012  Pavillon et al.
2013/0057935 A1* 3/2013  Joo ..................... G03H 1/0866
                                                   359/10

FOREIGN PATENT DOCUMENTS

| KR | 100867302 | B1 | 11/2008 |
| KR | 100870967 | B1 | 12/2008 |
| KR | 100906508 | B1 | 7/2009 |
| KR | 101003241 | B1 | 12/2010 |
| KR | 20160029359 | A | 3/2016 |
| KR | 20160029606 | A | 3/2016 |
| KR | 20160125795 | A | 11/2016 |

OTHER PUBLICATIONS

Written Opinion (PCT/ISA/237) dated Feb. 5, 2018, by the Korean Patent Office as the International Searching Authority for International Application No. PCT/KR2017/013238.

* cited by examiner

<RECONSTRUCTED ON-AXIS 3D HOLOGRAM (320a)>

<RECONSTRUCTED ON-AXIS 3D HOLOGRAM (320b)>

<RELATED ART>

<PRESENT DISCLOSURE (320a)>

FIG. 2I

|  | OFF-AXIS RECONSTRUCTION [RELATED ART] | ON-AXIS RECONSTRUCTION [RELATED ART] |
|---|---|---|
| INFORMATION LOSS RATE | HIGH | LOW |
| NOISE REMOVAL RATE | LOW | HIGH |
| DEVICE MANUFACTURING COST | LOW | HIGH |
| TIME DELAY ERROR OCCURRED? | YES | YES |
| NUMBER OF REQUIRED HOLOGRAMS | TWO HOLOGRAM [OBJECT HOLOGRAM AND REFERENCE HOLOGRAM] | 4 OBJECT HOLOGRAMS WITH DIFFERENT PHASE SHIFT DEGREES |

|  | OFF-AXIS RECONSTRUCTION [PRESENT DISCLOSURE] | ON-AXIS RECONSTRUCTION [PRESENT DISCLOSURE] |
|---|---|---|
| INFORMATION LOSS RATE | LOW | NO |
| NOISE REMOVAL RATE | HIGH | HIGH |
| DEVICE MANUFACTURING COST | LOW | LOW |
| TIME DELAY ERROR OCCURRED? | NO | NO |
| NUMBER OF REQUIRED HOLOGRAMS | ONE OBJECT HOLOGRAM | ONE OBJECT HOLOGRAM |

DIGITAL HOLOGRAPHIC RECONSTRUCTION DEVICE AND METHOD USING SINGLE GENERATION PHASE SHIFTING METHOD

TECHNICAL FIELD

The present disclosure relates to a digital holographic reconstruction device and method using a single generation phase shifting method.

More particularly, the present disclosure relates to a digital holographic reconstruction device and method using a single generation phase shifting method, which acquires only one object hologram, generates four phase-shifted object holograms from the acquired object hologram by using a wave optics-based interference equation, generates a complex conjugate hologram by removing direct current (DC) noise and virtual image information by using the four phase-shifted object holograms and a phase shifting method, extracts phase information of an object by using the generated complex conjugate hologram, and then reconstructs quantitative thickness information and three-dimensional (3D) shape information of the object, whereby a time delay error occurring in the case of acquiring two holograms (object hologram and reference hologram) necessary for reconstruction in the related art or in the case of acquiring four physical holograms having different phase shift degrees may be removed, DC noise (including background noise) may be completely removed by using a software-implemented phase shifting method, information loss caused by non-use of a filtering method according to the related art may be minimized, and optical elements (¼-wave plate and/or ½-wave plate) required in the related art may be unnecessary, and thus the digital holographic reconstruction device may be simple in overall structure, may be implemented at low cost, may be universally applied to both the reflection-type and transmission-type hologram reconstruction devices of the related art, and may be applied to devices for detection of defects in ultrafine structures such as thin film transistors (TFTs) and semiconductors, medical devices requiring display of accurate 3D images, and devices for detection, identification, or display in various fields, including detection of refractive index errors in transparent objects such as lenses.

BACKGROUND ART

While a general microscope is a device that measures the shape of an object by measuring the intensity of light reflected or transmitted from an object by irradiating a general light source to the object, a digital holography microscope is a device that measures interference and diffraction phenomenons of light when light is irradiated to an object, records the results thereof digitally, and reconstructs shape information of the object from the information thereof.

That is, digital holography technology generates single-wavelength light such as laser, splits the same into two beams by using a light splitter, directly irradiates one beam to an image sensor (referred to a reference beam), irradiates the other beam to a measurement target object and irradiates the beam reflected from the measurement target object to the image sensor (referred to as an object beam), records beam interference pattern information, which is generated due to an interference phenomenon between the reference beam and the object beam in the image sensor, through a digital image sensor, and reconstructs the shape of the measurement target object from the recorded interference pattern information by using a computer. In this case, the recorded interference pattern information is generally referred to as a hologram.

The digital holography microscope is different from an optical holography method of the related art in that it measures beam interference pattern information through a digital image sensor, stores the same digitally, and reconstructs the shape of a measurement target object by processing the stored interference pattern information not through an optical method but through a numerical operation method using a computer device.

Examples of the digital holography technologies of the related art include Korean Patent No. 10-0838586 registered on Jun. 10, 2008 and entitled "3D Measurement Device Using Digital Holography and 3D Measurement Method" (hereinafter referred to as "Related Art 1"), Korean Patent No. 10-0867302 registered on Oct. 31, 2008 and entitled "3D Measurement Device Using Digital Holography" (hereinafter referred to as "Related Art 2"), Korean Patent No. 10-0906508 registered on Jun. 30, 2009 and entitled "3D Measurement Device Using Digital Holography" (hereinafter referred to as "Related Art 3"), Korean Patent No. 10-1003241 registered on Nov. 21, 2008 and entitled "3D Measurement Device Using On-axis Digital Holography" (hereinafter referred to as "Related Art 4"), and Korean Patent No. 10-0870967 registered on Nov. 21, 2008 and entitled "Digital Hologram Recording/Reproducing Device and Recording/Reproducing Method for Removing Virtual Image" (hereinafter referred to as "Related Art 5").

For example, FIG. 1 is a diagram illustrating a configuration of a 3D measurement device using digital holography, according to Related Art 1.

Referring to FIG. 1, the 3D measurement device using digital holography according to Related Art 1 includes a light source 10, a first imaging unit 23, a second imaging unit 24, a light splitting unit 13, a first wave plate 18, and a second wave plate 20.

A beam emitted from the light source 10 becomes a parallel beam by passing through a pinhole (not illustrated) of a fixing member 11 and a convex lens 12 arranged between the fixing member 11 and the light splitting part 13, and the parallel beam is incident on the light splitting unit 13. The light splitting unit 13 (e.g., a polarizer beam splitter (PBS)) splits the beam emitted from the light source 10 into a reference beam and an object beam the polarization directions of which are perpendicular to each other, and directs the reference beam and the object beam to a reference plane 3 and a measurement target object 1, respectively.

A third wave plate 15 is arranged between the light splitting unit 13 and the reference plane 3, and a fourth wave plate 14 is arranged between the light splitting unit 13 and the measurement target object 1. The third wave plate 15 and the fourth wave plate 14 may be implemented as ¼-wave plates. The reference beam directed from the light splitting unit 13 to the reference plane 3 passes through the third wave plate 15, and the reference beam passed through the third wave plate 15 is directed to the reference plane 3. The reference beam reflected from the reference plane 3 again passes through the third wave plate 15. In this case, the polarization direction between the reference beam incident on the third wave plate 15 from the light splitting unit 13 and the reference beam reflected from the reference plane 3 and passed through the third wave plate 15 has a difference of 90.

Also, the object beam directed from the light splitting unit 13 to the measurement target object 1 passes through the fourth wave plate 14, and the object light passed through the fourth wave plate 14 is directed to the measurement target object 1. The object beam reflected from the measurement target object 1 again passes through the fourth wave plate 14. In this case, as in the reference beam, the polarization direction between the object beam incident on the fourth wave plate 14 from the light splitting unit 13 and the object beam reflected from the measurement target object 1 and passed through the fourth wave plate 14 has a difference of 90.

As described above, since the third wave plate 15 and the fourth wave plate 14 are located between the light splitting unit 13 and the reference plane 3 and the measurement target object 1 respectively, the energy loss of light passing through the light splitting unit 13 in the form of a polarizer beam splitter may be minimized.

Meanwhile, the reference beam and the object beam respectively reflected from the reference plane 3 and the measurement target object 1 and passed through the third wave plate 15 and the fourth wave plate 14 again pass through the light splitting unit 13 and are directed to the first wave plate 18. A mutual interference occurs as the reference beam and the object beam from the light splitting unit 13 pass through the first wave plate 18.

Also, an interference beam passes through a prism unit 19. As the interference beam passes through the prism unit 19, it is split into a first interference beam directed to the first imaging unit 23 and a second interference beam directed to the second imaging unit 24. In this case, the first interference beam and the second interference beam have a phase difference of 180. The first interference beam directed to the first imaging unit 23 is captured by the first imaging unit 23 and acquired as image information having one phase, for example, a phase of 0. On the other hand, the second interference light directed to the second imaging unit 24 passes through the second wave plate 20 with a phase delay of 90 and is incident on the second imaging unit 24. As a result, the phase difference between the second interference beam captured by the second imaging unit 24 and the first interference beam captured by the first imaging unit 23 becomes 90 due to the second wave plate 20, and thus two pieces of image information for acquiring a 3D image may be simultaneously acquired by the first imaging unit 23 and the second imaging unit 24. Herein, each of the first wave plate 18 and the second wave plate 20 may be implemented as a ¼-wave plate.

The first imaging unit 23 and the second imaging unit 24 may be implemented as charge coupled device (CCD) cameras, the first and second interference beams acquired by the first and second imaging units 23 and 24 may be used by a controller such as a computer (not illustrated) to acquire a 3D image of the measurement target object 1, and a Fresnel transform used in the digital holography method of the related art may be applied to acquire a 3D image based on digital holography.

In Related Art 1 described above, since image information having a phase difference of 90 is simultaneously captured in one shot by the first imaging unit 23 and the second imaging unit 24, the measurement speed limitation caused by the on-axis method of the related art requiring a plurality of holograms may be solved and the high-speed measurement capability of the off-axis method may be achieved. Also, since the reference beam and the object beam has a certain angle due to the off-axis method of the related art, the limitation of failing to use the entire region of the CCD camera, that is, degradation of lateral resolution, may be prevented.

The following limitations may arise in the generation and reconstruction of a hologram in holography methods of the related art (including an optical holography method and a digital holography method).

First, in the optical holography method of the related art, a time delay error may occur in the case of acquiring two holograms (object hologram and reference hologram) required for hologram reconstruction.

Also, in the off-axis holography method among the holography methods of the related art, due to the DC noise (including background noise) that is not removed in hologram reconstruction, acquisition of quantitative 3D information of an object may be difficult or an error may occur.

Also, in the on-axis holography method among the holography methods of the related art, since DC information and virtual image information are not separated in the acquired hologram, complete removal of the DC information and the virtual image information may be impossible, use of two image sensors (in the case of Related Arts 1 to 3) or three image sensors (in the case of Related Art 4) may be required, and use of one, two, or four physical optical devices is required to use a phase shifting method (particularly, use of four ¼-wave plates may be required in the case of Related Art 1, use of one ¼-wave plate may be required in the case of Related Art 2, use of two ¼-wave plates may be required in the case of Related Art 3, and use of one ¼-wave plate and one ½-wave plate (i.e., two wave plates) may be required in the case of Related Art 4. Thus, in the related art, the overall structure of a hologram generating and reconstructing device may be complex and the total manufacturing cost may be high.

Also, in the case of Related Art 5, although it may be possible to reconstruct a 3D hologram image where virtual image information is removed by using a 4-split method, since the object information included in the DC information may be lost in the process of removing the DC information and the DC information may not be completely removed due to the technical limitations, accurate 3D information of a measurement object may not be acquired.

Thus, a new method for solving the above limitations may be required.

RELATED ART DOCUMENT

Patent Document

1. Korean Patent No. 10-0838586
2. Korean Patent No. 10-0867302
3. Korean Patent No. 10-0906508
4. Korean Patent No. 10-1003241
5. Korean Patent No. 10-0870967

DESCRIPTION OF EMBODIMENTS

Technical Problem

Provided is a digital holographic reconstruction device and method using a single generation phase shifting method, which acquires only one object hologram, generates four phase-shifted object holograms from the acquired object hologram by using a wave optics-based interference equation, generates a complex conjugate hologram by removing direct current (DC) noise and virtual image information by using the four phase-shifted object holograms and a phase shifting method, extracts phase information of an object by using the generated complex conjugate hologram, and then reconstructs quantitative thickness information and three-dimensional (3D) shape information of the object, whereby a time delay error occurring in the case of acquiring two holograms (object hologram and reference hologram) necessary for reconstruction in the related art or in the case of acquiring four physical holograms having different phase shift degrees may be removed, DC noise (including background noise) may be completely removed by using a software-implemented phase shifting method, information loss caused by non-use of a filtering method according to the related art may be minimized, and optical elements (¼-wave plate and/or ½-wave plate) required in the related art may be unnecessary, and thus the digital holographic reconstruction device may be simple in overall structure, may be implemented at low cost, may be universally applied to both the reflection-type and transmission-type hologram reconstruction devices of the related art, and may be applied to devices for detection of defects in ultrafine structures such as thin film transistors (TFTs) and semiconductors, medical devices requiring display of accurate 3D images, and devices for detection, identification, or display in various fields, including detection of refractive index errors in transparent objects such as lenses.

Solution to Problem

According to an aspect of the present disclosure, a digital holographic reconstruction device using a single generation phase shifting method includes: a light source unit emitting a single-wavelength light; a collimator collimating the single-wavelength light emitted from the light source unit; a light splitter splitting the single-wavelength light passed through the collimator into an object beam and a reference beam; an object beam objective lens transmitting the object beam generated by the light splitter; a reference beam objective lens transmitting the reference beam generated by the light splitter; an optical mirror reflecting the reference beam passed through the reference beam objective lens; a recording medium recording an interference pattern formed when an object beam passed through the object beam objective lens and then reflected from a surface of a measurement target object and a reference beam reflected by the optical mirror pass through the object beam objective lens and the reference beam objective lens respectively and then are transmitted to the light splitter; and a processor receiving and storing an image file generated by converting the interference pattern from the recording medium, wherein the processor generates first to fourth phase-shifted object holograms from an object hologram acquired from the image file by using a wave optics-based interference equation, generates a complex conjugate hologram by removing DC noise and virtual image information by using the generated first to fourth phase-shifted object holograms and a software-implemented phase shifting method, extracts phase information of the measurement target object by using the generated complex conjugate hologram, and then reconstructs 3D information of the measurement target object.

According to another aspect of the present disclosure, a digital holographic reconstruction device using a single generation phase shifting method includes: a light source unit emitting a single-wavelength light; a collimator collimating the single-wavelength light emitted from the light source unit; a light splitter splitting the single-wavelength light passed through the collimator into an object beam and a reference beam; an object beam objective lens transmitting an object-transmitted beam including information of a measurement target object after the object beam generated by the light splitter is reflected by the measurement target object; a second optical mirror reflecting a light source other than the object-reflected beam passed through the object beam objective lens; a reference beam objective lens transmitting the reference beam generated by the light splitter; a first optical mirror reflecting the reference beam passed through the reference beam objective lens; a second light splitter to which the reference beam reflected by the first optical mirror and the object-reflected beam reflected by the second optical mirror are transmitted; a recording medium recording an interference pattern formed by the reference beam and the object-reflected beam both transmitted to the second light splitter; and a processor receiving and storing an image file generated by converting the interference pattern from the recording medium, wherein the processor generates first to fourth phase-shifted object holograms from an object hologram acquired from the image file by using a wave optics-based interference equation, generates a complex conjugate hologram by removing DC noise and virtual image information by using the generated first to fourth phase-shifted object holograms and a software-implemented phase shifting method, extracts phase information of the measurement target object by using the generated complex conjugate hologram, and then reconstructs 3D information of the measurement target object.

According to another aspect of the present disclosure, a digital holographic reconstruction method using a single generation phase shifting method includes: an operation a) of acquiring an object hologram of a measurement target object; an operation b) of generating a first phase-shifted object hologram from the acquired object hologram by separately extracting object beam information having phase information of the measurement target object and reference beam information having no phase information of the measurement target object; an operation c) of generating a second phase-shifted object hologram by phase-shifting the extracted reference beam information by 90°; an operation d) of generating a third phase-shifted object hologram by phase-shifting the extracted reference beam information by 180°; an operation e) of generating a fourth phase-shifted object hologram by phase-shifting the extracted reference beam information by 270°; an operation f) of extracting phase information of the measurement target object by removing DC information, DC noise, and virtual image information by using the generated first to fourth phase-shifted object holograms and a phase shifting method; and an operation g) of compensating the extracted phase information for distorted phase information and reconstructing quantitative thickness information and 3D shape information of the measurement target object by calculating quantitative thickness information of the measurement target object by using the compensated phase information.

Advantageous Effects of Disclosure

The following advantages may be achieved by using the digital holographic reconstruction device and method using a single generation phase shifting method according to the present disclosure.

1. A time delay error occurring in the case of acquiring two holograms (object hologram and reference hologram) necessary for reconstruction in the related art or in the case of acquiring four physical holograms having different phase shift degrees may be removed.

2. DC noise (including background noise) may be completely removed by using a software-implemented phase shifting method.

3. Information loss caused by non-use of a filtering method according to the related art may be minimized.

4. Optical elements (¼-wave plate and/or ½-wave plate) required in the related art may be unnecessary, and thus the digital holographic reconstruction device may be simple in overall structure and may be implemented at low cost.

5. Particularly, the digital holographic reconstruction device may be universally applied to both the reflection-type and transmission-type hologram reconstruction devices of the related art.

6. The digital holographic reconstruction device may be applied to devices for detection of defects in ultrafine structures such as TFTs and semiconductors, medical devices requiring display of accurate 3D images, and devices for detection, identification, or display in various fields, including detection of refractive index errors in transparent objects such as lenses.

Additional advantages of the present disclosure will be clearly understood from the following description with reference to the accompanying drawings, in which like or similar reference numerals denote like elements.

BRIEF DESCRIPTION OF DRAWINGS

FIG. 2I is a diagram illustrating a comparison table between the characteristics of off-axis reconstruction and on-axis reconstruction of holograms according to the related art and the present disclosure.

BEST MODE

Hereinafter, embodiments of the present disclosure will be described in detail with reference to the accompanying drawings.

Figure 1:
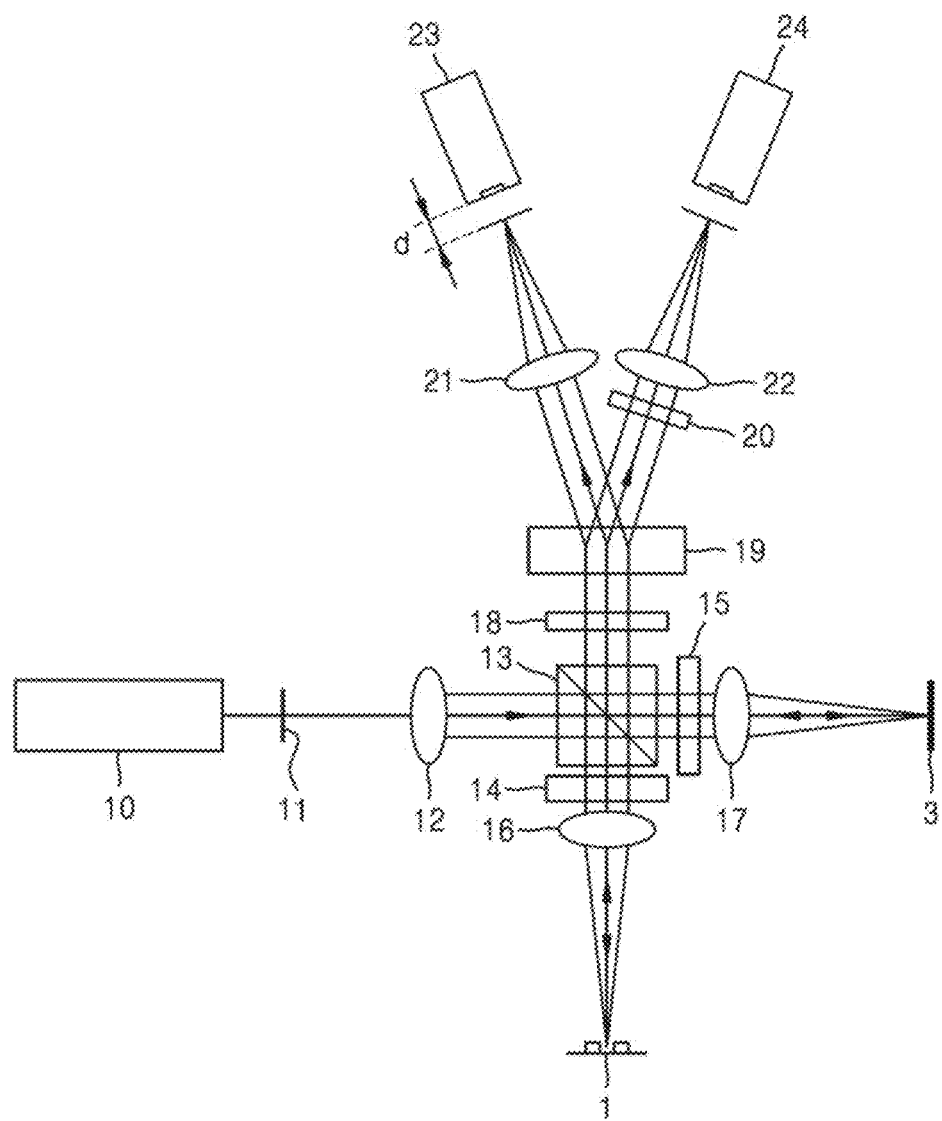
FIG. 1 is a diagram illustrating a configuration of a 3D measurement device using digital holography, according to Related Art 1.
Figure 2A:
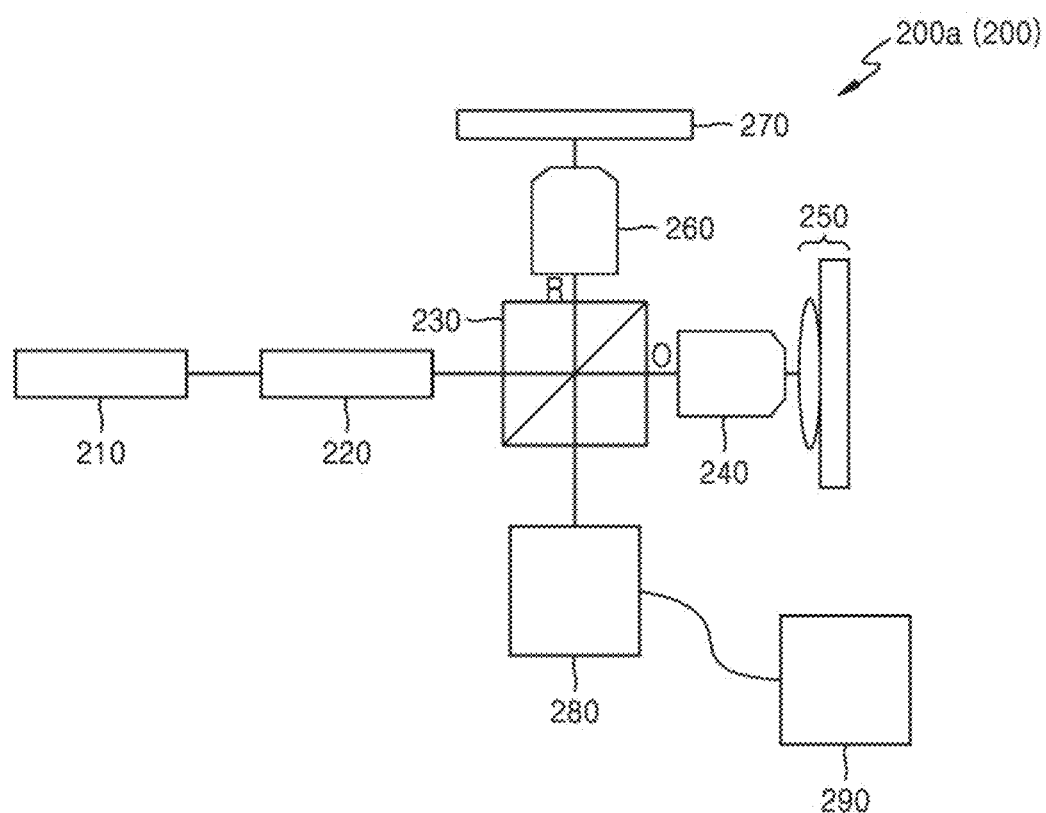
FIG. 2A is a schematic block diagram of a digital holographic reconstruction device using a single generation phase shifting method, according to an embodiment of the present disclosure.

FIG. 2A is a schematic block diagram of a digital holographic reconstruction device using a single generation phase shifting method, according to an embodiment of the present disclosure.

Referring to FIG. 2A, a digital holographic reconstruction device 200a using a single generation phase shifting method according to an embodiment of the present disclosure may include: a light source unit 210 emitting a single-wavelength light; a collimator 220 collimating the single-wavelength light emitted from the light source unit 210; a light splitter 230 splitting the single-wavelength light passed through the collimator 220 into an object beam O and a reference beam R; an object beam objective lens 240 transmitting the object beam O generated by the light splitter 230; a reference beam objective lens 260 transmitting the reference beam R generated by the light splitter 230; an optical mirror 270 reflecting the reference beam R passed through the reference beam objective lens 260; a recording medium 280 recording an interference pattern formed when an object beam O passed through the object beam objective lens 240 and then reflected from a surface of a measurement target object 250 and a reference beam R reflected by the optical mirror 270 pass through the object beam objective lens 240 and the reference beam objective lens 260 respectively and then are transmitted to the light splitter 230; and a processor 290 receiving and storing an image file generated by converting the interference pattern from the recording medium 280, wherein the processor 290 may generate first to fourth phase-shifted object holograms from an object hologram acquired from the image file by using a wave optics-based interference equation, generate a complex conjugate hologram by removing DC information, DC noise, and virtual image information by using the generated first to fourth phase-shifted object holograms and a software-implemented phase shifting method, extract phase information of the measurement target object 250 by using the generated complex conjugate hologram, and then reconstruct 3D information of the measurement target object 250.

Figure 2B:
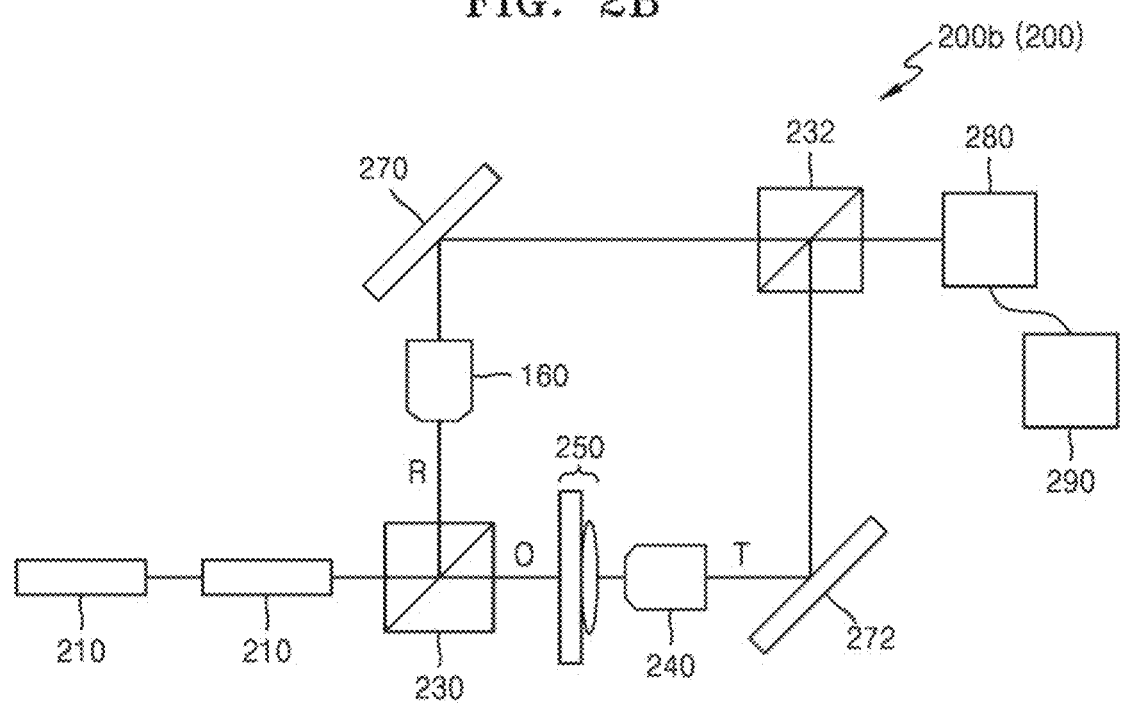
FIG. 2B is a schematic block diagram of a digital holographic reconstruction device using a single generation phase shifting method, according to another embodiment of the present disclosure.

FIG. 2B is a schematic block diagram of a digital holographic reconstruction device using a single generation phase shifting method, according to another embodiment of the present disclosure.

Referring to FIG. 2B, a digital holographic reconstruction device 200b using a single generation phase shifting method according to another embodiment of the present disclosure may include: a light source unit 210 emitting a single-wavelength light; a collimator 220 collimating the single-wavelength light emitted from the light source unit 210; a light splitter 230 splitting the single-wavelength light passed through the collimator 220 into an object beam O and a reference beam R; an object beam objective lens 240 transmitting an object-transmitted beam T including information of a measurement target object 250 after the object beam O generated by the light splitter 230 passes through the measurement target object 250; a second optical mirror 272 reflecting the object-transmitted beam T passed through the object beam objective lens 240; a reference beam objective lens 260 transmitting the reference beam R generated by the light splitter 230; a first optical mirror 270 reflecting the reference beam R passed through the reference beam objective lens 260; a second light splitter 232 to which the reference beam R reflected by the first optical mirror 270 and the object-transmitted beam T reflected by the second optical mirror 272 are transmitted; a recording medium 280 recording an interference pattern formed by the reference beam R and the object-transmitted beam T both transmitted to the second light splitter 232; and a processor 290 receiving and storing an image file generated by converting the interference pattern from the recording medium 280, wherein the processor may generate first to fourth phase-shifted object holograms from an object hologram acquired from the image file by using a wave optics-based interference equation, generate a complex conjugate hologram by removing DC information, DC noise, and virtual image information by using the generated first to fourth phase-shifted object holograms and a software-implemented phase shifting method, extract phase information of the measurement target object 250 by using the generated complex conjugate hologram, and then reconstruct 3D information of the measurement target object 250.

The digital holographic reconstruction device 200a using a single generation phase shifting method according to an embodiment of the present disclosure illustrated in FIG. 2A and the digital holographic reconstruction device 200b using a single generation phase shifting method according to another embodiment of the present disclosure illustrated in FIG. 2B may have substantially the same configuration except that the object beam O is reflected from the measurement target object 250 (the embodiment of FIG. 2A) or the object beam O is transmitted through the measurement target object 250 (the embodiment of FIG. 2B) and except the additional use of some components (e.g., the second optical mirror 272 and the second light splitter 232 of the embodiment of FIG. 2B) according thereto and the arrangement of some components according thereto, and may have the same feature in that the interference pattern is recorded on the recording medium 280 and a digital reference hologram is calculated from the object hologram acquired in the form of an image file from the recorded interference pattern by the processor 290. Hereinafter, the digital holographic reconstruction devices 200a and 200b using a single generation phase shifting method according to the embodiments of the present disclosure will be collectively referred to as a digital holographic reconstruction device 200 using a single generation phase shifting method according to an embodiment of the present disclosure.

The processor 290 of the digital holographic reconstruction device 200 using a single generation phase shifting method according to an embodiment of the present disclosure may be implemented, for example, as an device capable of arithmetical operations, such as a microprocessor or a personal computer (PC), and the recording medium 280 may be implemented, for example, as an image sensor such as a charge coupled device (CCD) or a complementary metal-oxide semiconductor (CMOS).

Also, the information of the object hologram acquired by the processor 290 of the digital holographic reconstruction device 200 using a single generation phase shifting method according to an embodiment of the present disclosure may include wavelength, interference angle, phase, and aberration of the object beam objective lens 240 and may further include noise.

Figure 2C:
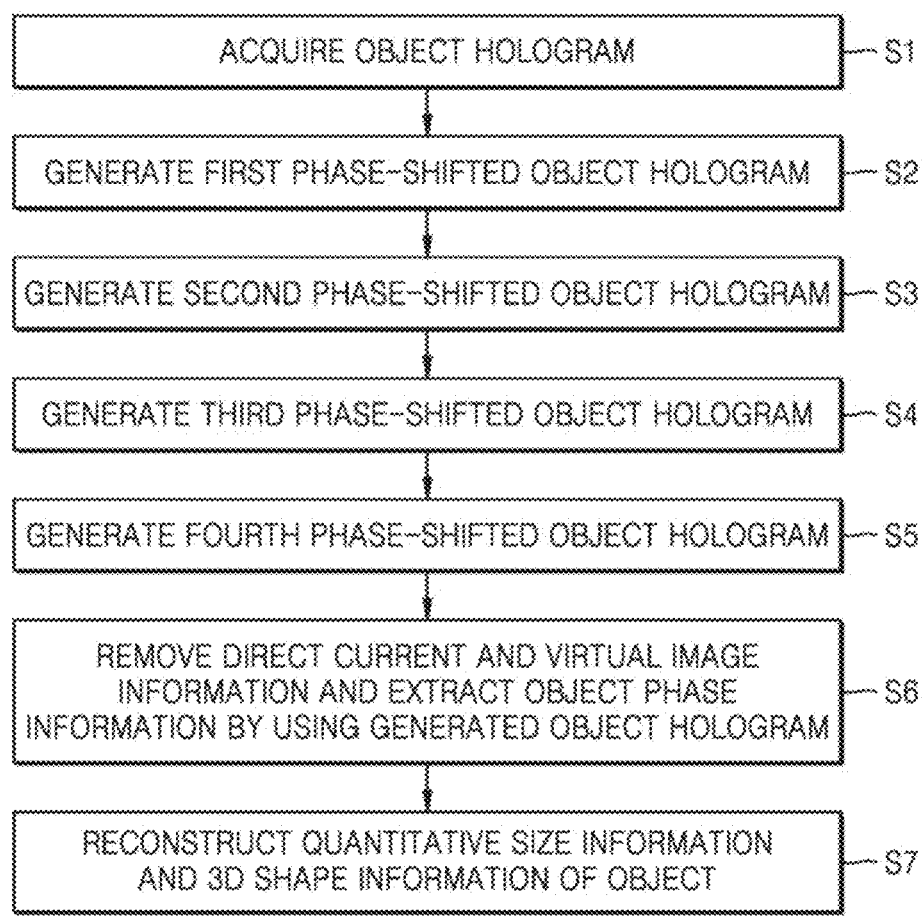
FIG. 2C is a schematic flowchart illustrating a digital holographic reconstruction method using a single generation phase shifting method, according to an embodiment of the present disclosure.
Figure 2D:
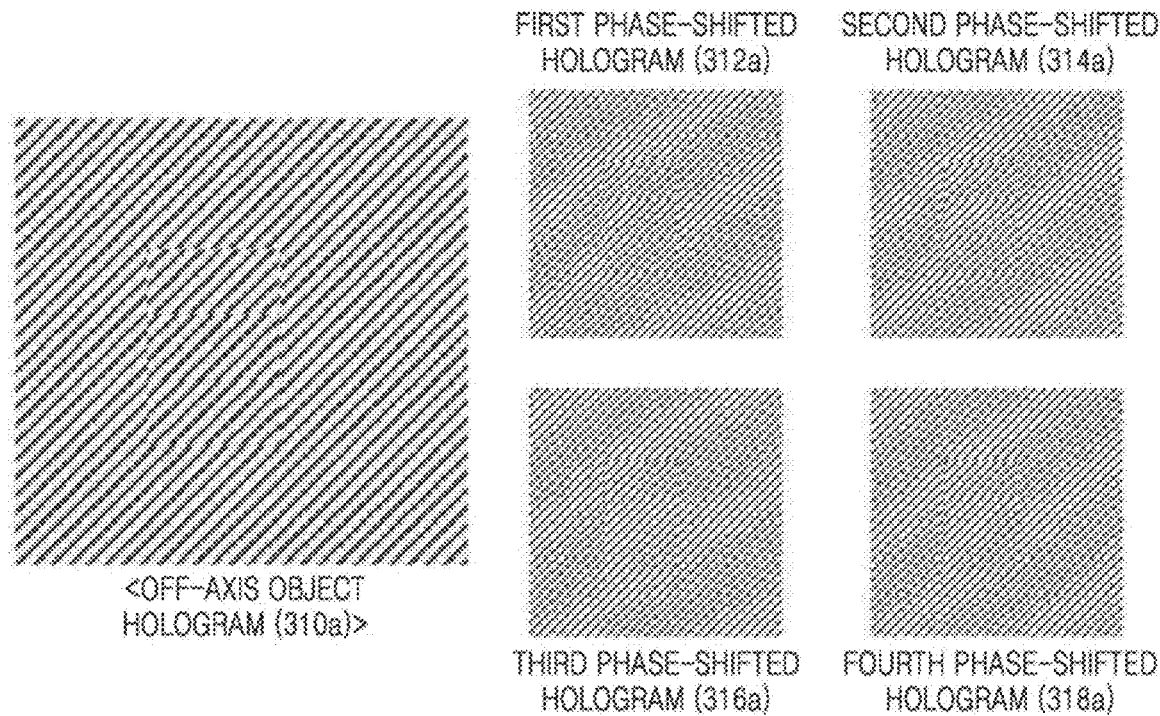
FIG. 2D is a diagram illustrating an object hologram of steps having different thicknesses of three levels and first to fourth phase-shifted holograms generated in the object hologram, in an off-axis holographic method according to an embodiment of the present disclosure.
Figure 2E:
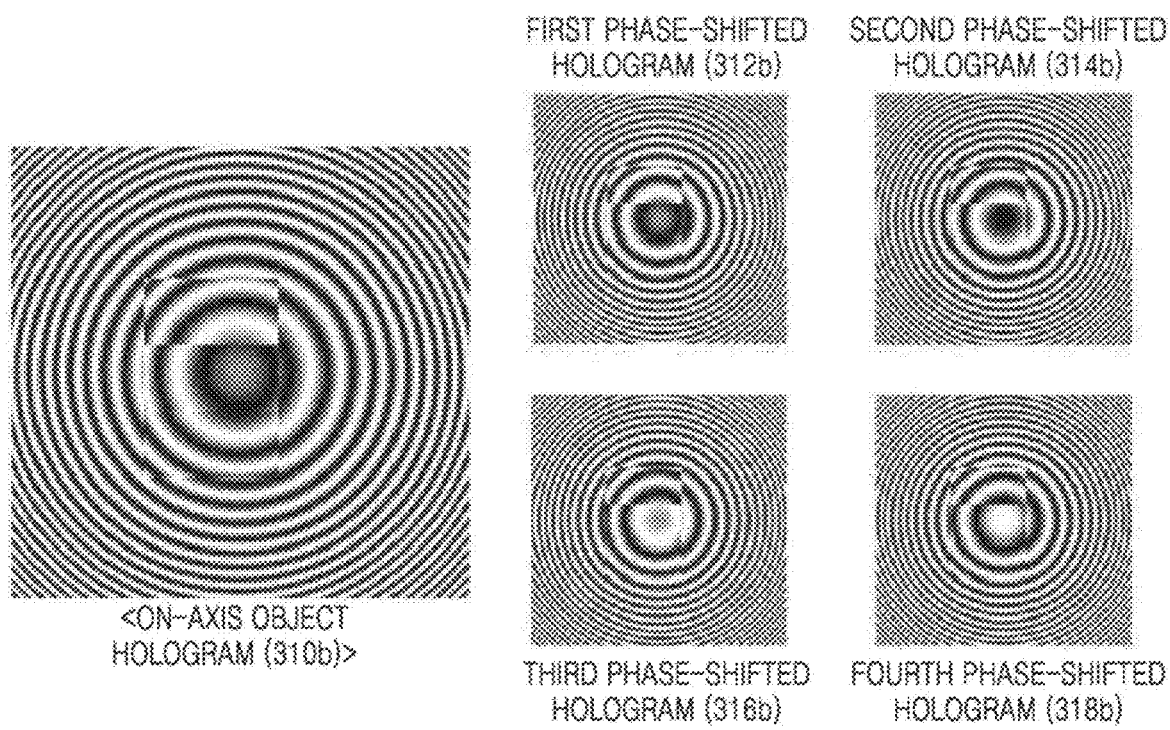
FIG. 2E is a diagram illustrating an object hologram of steps having different thicknesses of three levels and first to fourth phase-shifted holograms generated in the object hologram, in an on-axis holographic method according to an embodiment of the present disclosure.
Figure 2F:
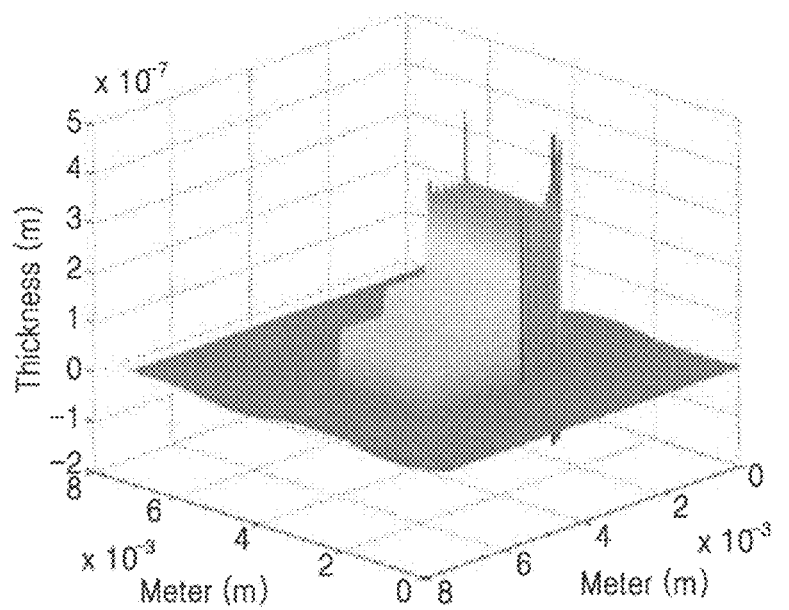
FIG. 2F is a diagram illustrating a 3D object hologram of steps having different thicknesses of three levels, which is obtained by reconstructing four phase-shifted holograms illustrated in FIG. 2D by using a software-based phase shifting method, in an off-axis holographic method according to an embodiment of the present disclosure.
Figure 2G:
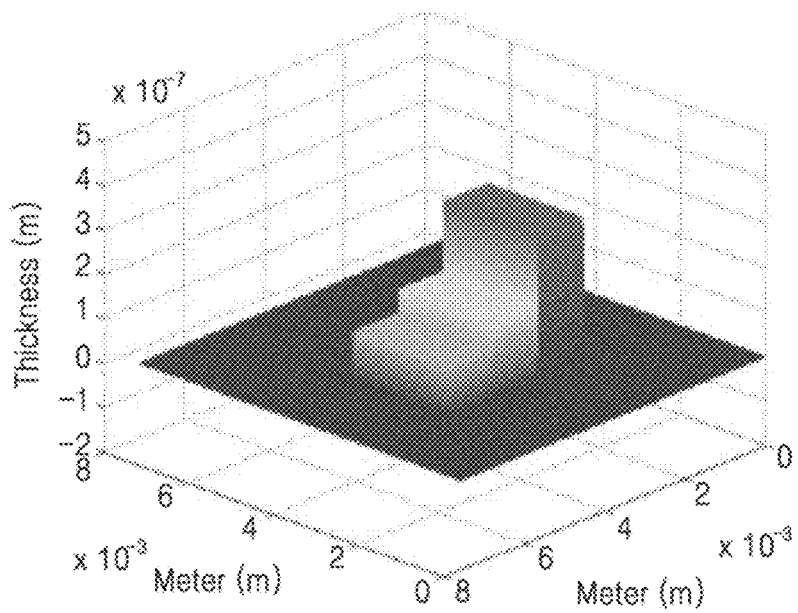
FIG. 2G is a diagram illustrating a 3D object hologram of steps having different thicknesses of three levels, which is obtained by reconstructing four phase-shifted holograms illustrated in FIG. 2E by using a software-based phase shifting method, in an on-axis holographic method according to an embodiment of the present disclosure.

FIG. 2C is a schematic flowchart illustrating a digital holographic reconstruction method using a single generation phase shifting method, according to an embodiment of the present disclosure. FIG. 2D is a diagram illustrating an object hologram of steps having different thicknesses of three levels and first to fourth phase-shifted holograms generated in the object hologram, in an off-axis holographic method according to an embodiment of the present disclosure. FIG. 2E is a diagram illustrating an object hologram of steps having different thicknesses of three levels and first to fourth phase-shifted holograms generated in the object hologram, in an on-axis holographic method according to an embodiment of the present disclosure. FIG. 2F is a diagram illustrating a 3D object hologram of steps having different thicknesses of three levels, which is obtained by reconstructing four phase-shifted holograms illustrated in FIG. 2D by using a software-based phase shifting method, in an off-axis holographic method according to an embodiment of the present disclosure. FIG. 2G is a diagram illustrating a 3D object hologram of steps having different thicknesses of three levels, which is obtained by reconstructing four phase-shifted holograms illustrated in FIG. 2E by using a software-based phase shifting method, in an on-axis holographic method according to an embodiment of the present disclosure.

Referring to FIGS. 2C to 2G and FIGS. 2A and 2B, the processor 290 of the digital holographic reconstruction device 200 using a single generation phase shifting method according to an embodiment of the present disclosure may acquire an object hologram 310a or 310b from the image file generated and stored by the processor 290 (operation S1). In the following description, it should be noted that "a" is used to represent a reference numeral associated with an off-axis hologram and "b" is used to represent a reference numeral associated with an on-axis hologram.

More particularly, when the angle formed between two beams (i.e., the object beam O and the reference beam R) is zero (that is, when they are on the same axis), the acquired object hologram 310a or 310b is an on-axis hologram 310b, and when the angle formed between the two beams is not zero (that is, when they are not on the same axis), the acquired object hologram 310a or 310b is an off-axis hologram 310a. The acquired object hologram 310a or 310b is a complex conjugate hologram and may be expressed as Equation 1 below.

$$|U_o(x,y,0)|^2 = |O(x,y)|^2 = |R(x,y)|^2 + O^*(x,y)R(x,y) + O(x,y)R^*(x,y)$$ Equation 1:

In Equation 1, x and y denote spatial coordinates, $U_o(x,y,0)$ denotes the acquired object hologram, $O(x,y)$ and $R(x,y)$ respectively denote the object beam O and the reference beam R, and $O^*(x,y)$ and $R^*(x,y)$ respectively denote the complex conjugates of the object beam O and the reference beam R.

Thereafter, the processor 290 may generate a first phase-shifted object hologram 312a or 312b from the acquired object hologram 310a or 310b (operation S2).

More particularly, the acquired object hologram 310a or 310b may include an interference pattern of the object beam O having phase information of the measurement target object 250 and the reference beam R having no phase information of the measurement target object 250, and the processor 290 may separately extract object beam information having phase information of the measurement target object 250 and reference beam information having no phase information of the measurement target object 250 by using a phase delay method in a frequency domain of the acquired object hologram 310a or 310b. Thereafter, the extracted reference beam information may be phase-shifted by 0°, and then the first phase-shifted object hologram 312a or 312b may be generated by combining the 0° phase-shifted reference beam information with the extracted object beam information by using a known wave optics-based interference equation ($U_H(r)=|O(r)+R(r)|$). The generated first phase-shifted object hologram 312a or 312b may be expressed as Equation 2 below.

$$U_{1ps}(r)=|O(r)+R(r+0)| \qquad \text{Equation 2:}$$

In Equation 2, "r" denotes a spatial coordinate vector, $U_{1ps}(r)$ denotes the first phase-shifted object hologram, $O(r)$ denotes the object beam information, and $R(r+0)$ denotes the 0° phase-shifted reference beam information.

Thereafter, the processor 290 may phase-shift the extracted reference beam information (in operation S2) by 90° and then generate a second phase-shifted object hologram 314a or 314b by combining the 90° phase-shifted reference beam information with the extracted object beam information by using the above wave optics-based interference equation (operation S3). The generated second phase-shifted object hologram 314a or 314b may be expressed as Equation 3 below.

$$U_{2ps}(r)=|O(r)+R(r+\pi/2)| \qquad \text{Equation 3:}$$

In Equation 3, "r" denotes a spatial coordinate vector, $U_{2ps}(r)$ denotes the second phase-shifted object hologram, $O(r)$ denotes the object beam information, and $R(r+\pi/2)$ denotes the 90° phase-shifted reference beam information.

Thereafter, the processor 290 may phase-shift the extracted reference beam information (in operation S2) by 180° and then generate a third phase-shifted object hologram 316a or 316b by combining the 180° phase-shifted reference beam information with the extracted object beam information by using the above wave optics-based interference equation (operation S4). The generated third phase-shifted object hologram 316a or 316b may be expressed as Equation 4 below.

$$U_{3ps}(r)=|O(r)+R(r+\pi)| \qquad \text{Equation 4:}$$

In Equation 4, "r" denotes a spatial coordinate vector, $U_{3ps}(r)$ denotes the third phase-shifted object hologram, $O(r)$ denotes the object beam information, and $R(r+\pi)$ denotes the 180° phase-shifted reference beam information.

Thereafter, the processor 290 may phase-shift the extracted reference beam information (in operation S2) by 270° and then generate a fourth phase-shifted object hologram 318a or 318b by combining the 270° phase-shifted reference beam information with the extracted object beam information by using the above wave optics-based interference equation (operation S5). The generated fourth phase-shifted object hologram 318a or 318b may be expressed as Equation 5 below.

$$U_{4ps}(r)=|O(r)+R(r+3\pi/2)| \qquad \text{Equation 5:}$$

In Equation 5, "r" denotes a spatial coordinate vector, $U_{4ps}(r)$ denotes the fourth phase-shifted object hologram, $O(r)$ denotes the object beam information, and $R(r+3\pi/2)$ denotes the 270° phase-shifted reference beam information.

In the above embodiment of the present disclosure, the processor 290 sequentially performs the operations S3, S4, and S5; however, it should be noted that the operations S3, S4, and S5 may be simultaneously performed by a parallel processing method to generate the second to fourth phase-shifted object holograms 314a or 314b; 316a or 316b; and 318a or 318b by phase-shifting the extracted reference beam information (in operation S2) by 90°, 180°, and 270°, respectively.

Thereafter, the processor 290 may remove DC information, DC noise (including background noise), and virtual image information by using four phase-shifted object holograms (i.e., the first to fourth phase-shifted object holograms 312a or 312b; 314a or 314b; 316a or 316b; and 318a or 318b) respectively generated in the operations S2 to S5 and a known phase shifting method implemented by software installed in the processor 290 (operation S6). This process may be expressed as Equation 6 below.

$$\frac{I_4(x,y)-I_2(x,y)}{I_1(x,y)-I_3(x,y)} = \frac{[I_{DC}(x,y)+2\sqrt{I_{DC}(x,y)}\sin\{\phi(x,y)\}]-[I_{DC}(x,y)-2\sqrt{I_{DC}(x,y)}\sin\{\phi(x,y)\}]}{[I_{DC}(x,y)+2\sqrt{I_{DC}(x,y)}\cos\{\phi(x,y)\}]-[I_{DC}(x,y)-2\sqrt{I_{DC}(x,y)}\cos\{\phi(x,y)\}]} \qquad \text{Equation 6}$$

In Equation 6, x and y denote spatial coordinates, $I_{DC}(x,y)$ denotes DC information and DC noise, $\phi(x,y)$ denotes phase information of the measurement target object 250, $I_1(x,y)$ denotes intensity information of the first phase-shifted object hologram 312a or 312b, $I_2(x,y)$ denotes intensity information of the second phase-shifted object hologram 314a or 314b, $I_3(x,y)$ denotes intensity information of the third phase-shifted object hologram 316a or 316b, and $I_4(x,y)$ denotes intensity information of the fourth phase-shifted object hologram 318a or 318b.

Thereafter, the phase information of the measurement target object 250 may be extracted by using the complex conjugate hologram generated by removing the DC information, the DC noise, and the virtual image information. The extracted phase information of the measurement target object 250 may be expressed as Equation 7 below.

$$\phi(x,y)=\tan^{-1}[I_4(x,y)-I_2(x,y)]/[I_1(x,y)-I_3(x,y)] \qquad \text{Equation 7:}$$

In Equation 7, x and y denote spatial coordinates, $\phi(x,y)$ denotes phase information of the measurement target object 250, $I_1(x,y)$ denotes intensity information of the first phase-shifted object hologram 312a or 312b, $I_2(x,y)$ denotes intensity information of the second phase-shifted object hologram 314a or 314b, $I_3(x,y)$ denotes intensity information of the third phase-shifted object hologram 316a or 316b, and $I_4(x,y)$ denotes intensity information of the fourth phase-shifted object hologram 318a or 318b.

Thereafter, the processor 290 may compensate the extracted phase information of the measurement target object 250 for distorted phase information by using a two-dimensional (2D) phase unwrapping algorithm and calculate quantitative thickness information of the measurement target object 250 by using the compensated phase information. The quantitative thickness information of the measurement target object 250 calculated by the processor 290 may be expressed as Equation 8 below.

$$\Delta L=\lambda\alpha\varphi(x,y)/2\pi\Delta n(x,y) \qquad \text{Equation 8:}$$

In Equation 8, $\Delta L$ denotes quantitative thickness information of the measurement target object 250, $\lambda$ denotes a wavelength of the light source unit 210 used to acquire the object hologram, $\varphi(x,y)$ denotes phase information of the measurement target object 250, and $\Delta n(x,y)$ denotes a refractive index difference between a background and the measurement target object 250.

Thereafter, the processor 290 may reconstruct the 3D shape of the measurement target object 250 by using the quantitative thickness information of the measurement target object 250 calculated according to Equation 8 (operation S7: see 320a and 320b in FIGS. 2F and 2G). The 3D shape reconstructed by the processor 290 may be displayed on a separate monitor (not illustrated) such as a display of a PC.

Figure 2H:
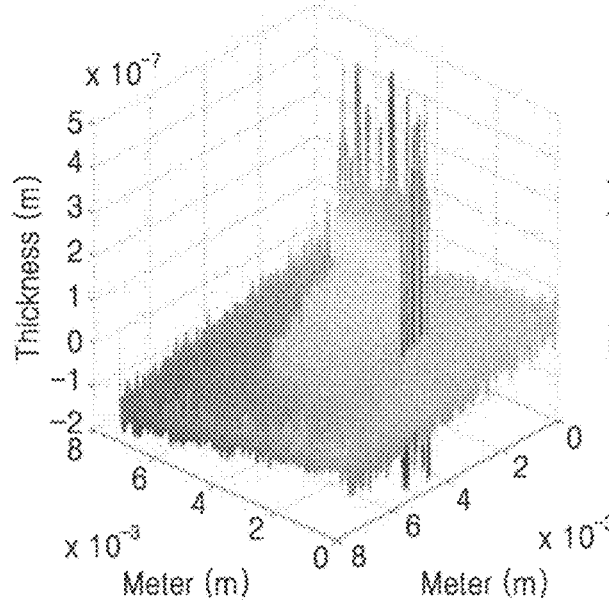
FIG. 2H is a diagram illustrating a comparison between a 3D object hologram reconstructed by using an off-axis optical holographic method of the related art and a 3D object hologram (see FIG. 2F) reconstructed by using an off-axis holographic method according to an embodiment of the present disclosure, with respect to steps having different thicknesses of three levels.
Figure 2H:
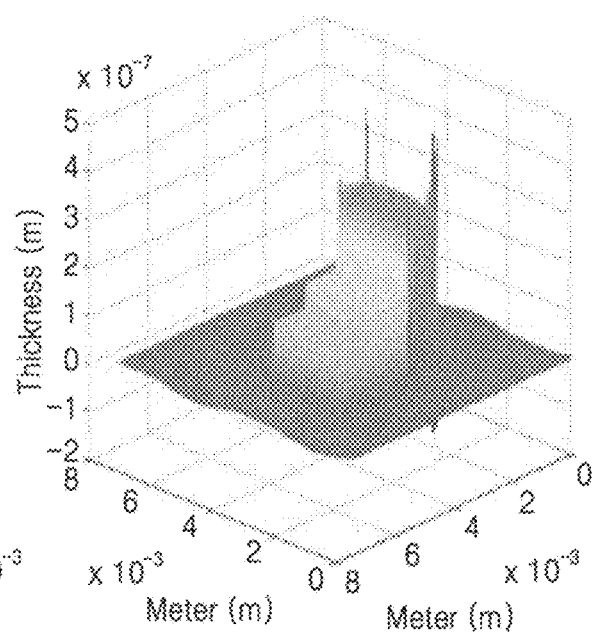

FIG. 2H is a diagram illustrating a comparison between a 3D object hologram reconstructed by using an off-axis optical holographic method of the related art and a 3D object hologram (see FIG. 2F) reconstructed by using an off-axis holographic method according to an embodiment of the present disclosure, with respect to steps having different thicknesses of three levels.

Referring to FIG. 2H, it may be seen that a 3D object hologram 320a reconstructed according to an embodiment of the present disclosure is much clearer than that reconstructed according to the related art.

FIG. 2I is a diagram illustrating a comparison table between the characteristics of off-axis reconstruction and on-axis reconstruction of holograms according to the related art and the present disclosure.

Referring to FIG. 2I, it may be seen that the off-axis reconstruction of the hologram according to the present disclosure is significantly improved in comparison with the related art in terms of the information loss degree, the noise removal degree, the time delay error, and the number of required holograms, and it may be seen that the on-axis reconstruction of the hologram according to the present disclosure is significantly improved in comparison with the related art in terms of the information loss degree, the device manufacturing cost, the time delay error, and the number of required holograms.

Hereinafter, a digital holographic reconstruction method using a single generation phase shifting method according to an embodiment of the present disclosure will be described.

Referring to FIGS. 2A to 2I, a digital holographic reconstruction method using a single generation phase shifting method according to an embodiment of the present disclosure may include: an operation a) of acquiring an object hologram 310a or 310b of a measurement target object 250 (S1); an operation b) of generating a first phase-shifted object hologram 312a or 312b from the acquired object hologram 310a or 310b by separately extracting object beam information having phase information of the measurement target object 250 and reference beam information having no phase information of the measurement target object 250 (S2); an operation c) of generating a second phase-shifted object hologram 314a or 314b by phase-shifting the extracted reference beam information by 90° (S3); an operation d) of generating a third phase-shifted object hologram 316a or 316b by phase-shifting the extracted reference beam information by 180° (S4); an operation e) of generating a fourth phase-shifted object hologram 318a or 318b by phase-shifting the extracted reference beam information by 270° (S5); an operation f) of extracting the phase information of the measurement target object 250 by removing DC information, DC noise, and virtual image information by using the generated first to fourth phase-shifted object holograms 312a or 312b; 314a or 314b; 316a or 316b; and 318a or 318b and a phase shifting method (S6); and an operation g) of compensating the extracted phase information for distorted phase information and reconstructing quantitative thickness information and 3D shape information of the measurement target object 250 by calculating quantitative thickness information of the measurement target object 250 by using the compensated phase information (S7).

In the digital holographic reconstruction method using a single generation phase shifting method according to an embodiment of the present disclosure, the operations c) to e) may be simultaneously performed.

Also, in the digital holographic reconstruction method using a single generation phase shifting method according to an embodiment of the present disclosure, in the operation c), the object beam information and the reference beam information may be separated and extracted by using a phase delay method in a frequency domain of the acquired object hologram 310a or 310b.

Also, in the digital holographic reconstruction method using a single generation phase shifting method according to an embodiment of the present disclosure, the first to fourth phase-shifted object holograms 312a or 312b; 314a or 314b; 316a or 316b; and 318a or 318b may be respectively generated by combining the 0°, 90°, 180°, and 270° phase-shifted reference beam information with the extracted object beam information by using a wave optics-based interference equation ($U_H(r)=|O(r)+R(r)|$).

Also, in the digital holographic reconstruction method using a single generation phase shifting method according to an embodiment of the present disclosure, the phase information of the measurement target object may be represented by an equation of $\phi(x,y)=\tan^{-1}[I_4(x,y)-I_2(x,y)]/[I_1(x,y)-I_3(x,y)]$ as in Equation 7, where x and y denote spatial coordinates, $\phi(x,y)$ denotes phase information of the measurement target object, and $I_1(x,y)$ denotes intensity information of the first phase-shifted object hologram 312a or 312b, $I_2(x,y)$ denotes intensity information of the second phase-shifted object hologram 314a or 314b, $I_3(x,y)$ denotes intensity information of the third phase-shifted object hologram 316a or 316b, and $I_4(x,y)$ denotes intensity information of the fourth phase-shifted object hologram 318a or 318b.

Also, in the digital holographic reconstruction method using a single generation phase shifting method according to an embodiment of the present disclosure, the extracted phase information of the measurement target object 250 may be compensated for the distorted phase information by using a 2D phase unwrapping algorithm.

Also, in the digital holographic reconstruction method using a single generation phase shifting method according to an embodiment of the present disclosure, the quantitative thickness information of the measurement target object 250 may be represented by an equation of $\Delta L=\lambda\Delta\phi(x,y)/2\pi\Delta n(x,y)$ as in Equation 8, where $\Delta L$ denotes quantitative thickness information of the measurement target object 250, $\lambda$ denotes a wavelength of the light source unit 210 used to acquire the object hologram, $\phi(x,y)$ denotes phase information of the measurement target object 250, and $\Delta n(x,y)$ denotes a refractive index difference between a background and the measurement target object 250.

As described above, according to the digital holographic reconstruction device (200) and method using a single generation phase shifting method according to the present disclosure, 1) a time delay error occurring in the case of acquiring two holograms (object hologram and reference hologram) necessary for reconstruction in the related art or in the case of acquiring four physical holograms having different phase shift degrees may be removed, 2) DC noise (including background noise) may be completely removed by using a software-implemented phase shifting method, 3) information loss caused by non-use of a filtering method according to the related art may be minimized, 4) optical elements (¼-wave plate and/or ½-wave plate) required in the related art may be unnecessary and thus the digital holographic reconstruction device may be simple in overall structure and may be implemented at low cost, 5) the digital holographic reconstruction device may be universally applied to both the reflection-type and transmission-type hologram reconstruction devices of the related art, and 6) the digital holographic reconstruction device may be applied to devices for detection of defects in ultrafine structures such as TFTs and semiconductors, medical devices requiring display of accurate 3D images, and devices for detection, identification, or display in various fields, including detection of refractive index errors in transparent objects such as lenses.

INDUSTRIAL APPLICABILITY

It is to be understood that all included in the detailed descriptions or illustrated in the accompanying drawings are merely illustrative and are not intended to limit the present disclosure since various changes or modifications may be made therein without departing from the scope of the present disclosure. Thus, the scope of the present disclosure should not be limited to the above example embodiments but should be determined only by the following claims and their equivalents.

The invention claimed is:

1. A digital holographic reconstruction device using a single generation phase shifting method, the digital holographic reconstruction device comprising:
a light source unit emitting a single-wavelength light;
a collimator collimating the single-wavelength light emitted from the light source unit;
a light splitter splitting the single-wavelength light passed through the collimator into an object beam and a reference beam;
an object beam objective lens transmitting the object beam generated by the light splitter;
a reference beam objective lens transmitting the reference beam generated by the light splitter;
an optical mirror reflecting the reference beam passed through the reference beam objective lens;
a recording medium recording an interference pattern formed when an object beam passed through the object beam objective lens and then reflected from a surface of a measurement target object and a reference beam reflected by the optical mirror pass through the object beam objective lens and the reference beam objective lens respectively and then are transmitted to the light splitter; and
a processor receiving and storing an image file generated by converting the interference pattern from the recording medium,
wherein the processor generates first to fourth phase-shifted object holograms from an object hologram acquired from the image file by using a wave optics-based interference equation, generates a complex conjugate hologram by removing direct current (DC) noise and virtual image information by using the generated first to fourth phase-shifted object holograms and a software-implemented phase shifting method, extracts phase information of the measurement target object by using the generated complex conjugate hologram, and then reconstructs three-dimensional (3D) information of the measurement target object.

2. A digital holographic reconstruction device using a single generation phase shifting method, the digital holographic reconstruction device comprising:
a light source unit emitting a single-wavelength light;
a collimator collimating the single-wavelength light emitted from the light source unit;
a light splitter splitting the single-wavelength light passed through the collimator into an object beam and a reference beam;
an object beam objective lens transmitting an object-transmitted beam including information of a measurement target object after the object beam generated by the light splitter passes through the measurement target object;
a second optical mirror reflecting the object-transmitted beam passed through the object beam objective lens;
a reference beam objective lens transmitting the reference beam generated by the light splitter;
a first optical mirror reflecting the reference beam passed through the reference beam objective lens;
a second light splitter to which the reference beam reflected by the first optical mirror and the object-transmitted beam reflected by the second optical mirror are transmitted;
a recording medium recording an interference pattern formed by the reference beam and the object-transmitted beam both transmitted to the second light splitter; and
a processor receiving and storing an image file generated by converting the interference pattern from the recording medium,
wherein the processor generates first to fourth phase-shifted object holograms from an object hologram acquired from the image file by using a wave optics-based interference equation, generates a complex conjugate hologram by removing direct current (DC) noise and virtual image information by using the generated first to fourth phase-shifted object holograms and a software-implemented phase shifting method, extracts phase information of the measurement target object by using the generated complex conjugate hologram, and then reconstructs three-dimensional (3D) information of the measurement target object.

3. The digital holographic reconstruction device of claim 1, wherein the processor separates and extracts the object beam information and the reference beam information by using a phase delay method in a frequency domain of the acquired object hologram.

4. The digital holographic reconstruction device of claim 2, wherein the processor separates and extracts the object beam information and the reference beam information by using a phase delay method in a frequency domain of the acquired object hologram.

5. The digital holographic reconstruction device of claim 3, wherein the processor phase-shifts the reference beam information by 0°, 90°, 180°, and 270° and then generates the first to fourth phase-shifted object holograms by combining the 0°, 90°, 180°, and 270° phase-shifted reference beam information with the extracted object beam information by using a wave optics-based interference equation.

6. The digital holographic reconstruction device of claim 4, wherein the processor phase-shifts the reference beam information by 0°, 90°, 180°, and 270° and then generates the first to fourth phase-shifted object holograms by combining the 0°, 90°, 180°, and 270° phase-shifted reference beam information with the extracted object beam information by using a wave optics-based interference equation.

7. The digital holographic reconstruction device of claim 5, wherein the processor simultaneously generates the second to fourth phase-shifted object holograms.

8. The digital holographic reconstruction device of claim 6, wherein the processor simultaneously generates the second to fourth phase-shifted object holograms.

9. The digital holographic reconstruction device of claim 1, wherein the phase information of the measurement target object is represented by an equation of $\phi(x,y)=\tan^{-1}[I_4(x,y)-I_2(x,y)]/[I_1(x,y)-I_3(x,y)]$, where x and y denote spatial coordinates, $\phi(x,y)$ denotes phase information of the measurement target object, and $I_1(x,y)$, $I_2(x,y)$, $I_3(x,y)$, and $I_4(x,y)$ respectively denote intensity information of the first to fourth phase-shifted object holograms.

10. The digital holographic reconstruction device of claim 2, wherein the phase information of the measurement target object is represented by an equation of $\phi(x,y)=\tan^{-1}[I_4(x,y)-I_2(x,y)]/[I_1(x,y)-I_3(x,y)]$, where x and y denote spatial coordinates, $\phi(x,y)$ denotes phase information of the measurement target object, and $I_1(x,y)$, $I_2(x,y)$, $I_3(x,y)$, and $I_4(x,y)$ respectively denote intensity information of the first to fourth phase-shifted object holograms.

11. The digital holographic reconstruction device of claim 1, wherein quantitative thickness information of the measurement target object is represented by an equation of $\Delta L=\lambda \Delta \varphi(x,y)/2\pi \Delta n(x,y)$, where $\Delta L$ denotes quantitative thickness information of the measurement target object, $\lambda$ denotes a wavelength of the light source unit, $\varphi(x,y)$ denotes phase information of the measurement target object, and $\Delta n(x,y)$ denotes a refractive index difference between a background and the measurement target object.

12. The digital holographic reconstruction device of claim 2, wherein quantitative thickness information of the measurement target object is represented by an equation of $\Delta L=\lambda \Delta \varphi(x,y)/2\pi \Delta n(x,y)$, where $\Delta L$ denotes quantitative thickness information of the measurement target object, $\lambda$ denotes a wavelength of the light source unit, $\varphi(x,y)$ denotes phase information of the measurement target object, and $\Delta n(x,y)$ denotes a refractive index difference between a background and the measurement target object.

13. A digital holographic reconstruction method using a single generation phase shifting method, the digital holographic reconstruction method comprising:
   an operation a) of acquiring an object hologram of a measurement target object;
   an operation b) of generating a first phase-shifted object hologram from the acquired object hologram by separately extracting object beam information having phase information of the measurement target object and reference beam information having no phase information of the measurement target object;
   an operation c) of generating a second phase-shifted object hologram by phase-shifting the extracted reference beam information by 90°;
   an operation d) of generating a third phase-shifted object hologram by phase-shifting the extracted reference beam information by 180°;
   an operation e) of generating a fourth phase-shifted object hologram by phase-shifting the extracted reference beam information by 270°;
   an operation f) of extracting phase information of the measurement target object by removing direct current (DC) information, DC noise, and virtual image information by using the generated first to fourth phase-shifted object holograms and a phase shifting method; and
   an operation g) of compensating the extracted phase information for distorted phase information and reconstructing quantitative thickness information and three-dimensional (3D) shape information of the measurement target object by calculating quantitative thickness information of the measurement target object by using the compensated phase information.

14. The digital holographic reconstruction method of claim 13, wherein the operations c) to e) are simultaneously performed.

15. The digital holographic reconstruction method of claim 13, wherein in the operation c), the object beam information and the reference beam information are separated and extracted by using a phase delay method in a frequency domain of the acquired object hologram.

16. The digital holographic reconstruction method of claim 13, wherein the first to fourth phase-shifted object holograms are respectively generated by combining the 0°, 90°, 180°, and 270° phase-shifted reference beam information with the extracted object beam information by using a wave optics-based interference equation.

17. The digital holographic reconstruction method of claim 13, wherein the phase information of the measurement target object is represented by an equation of $\phi(x,y)=\tan^{-1}[I_4(x,y)-I_2(x,y)]/[I_1(x,y)-I_3(x,y)]$, where x and y denote spatial coordinates, $\phi(x,y)$ denotes phase information of the measurement target object, and $I_1(x,y)$, $I_2(x,y)$, $I_3(x,y)$, and $I_4(x,y)$ respectively denote intensity information of the first to fourth phase-shifted object holograms.

18. The digital holographic reconstruction method of claim 13, wherein in the operation g), the extracted phase information of the measurement target object is compensated for the distorted phase information by using a two-dimensional (2D) phase unwrapping algorithm.

19. The digital holographic reconstruction method of claim 13, wherein quantitative thickness information of the measurement target object is represented by an equation of $\Delta L=\lambda \Delta \varphi(x,y)/2\pi \Delta n(x,y)$, where $\Delta L$ denotes quantitative thickness information of the measurement target object, $\lambda$ denotes a wavelength of a light source unit used to acquire the object hologram, $\varphi(x,y)$ denotes phase information of the measurement target object, and $\Delta n(x,y)$ denotes a refractive index difference between a background and the measurement target object.

* * * * *